Patented Feb. 23, 1937

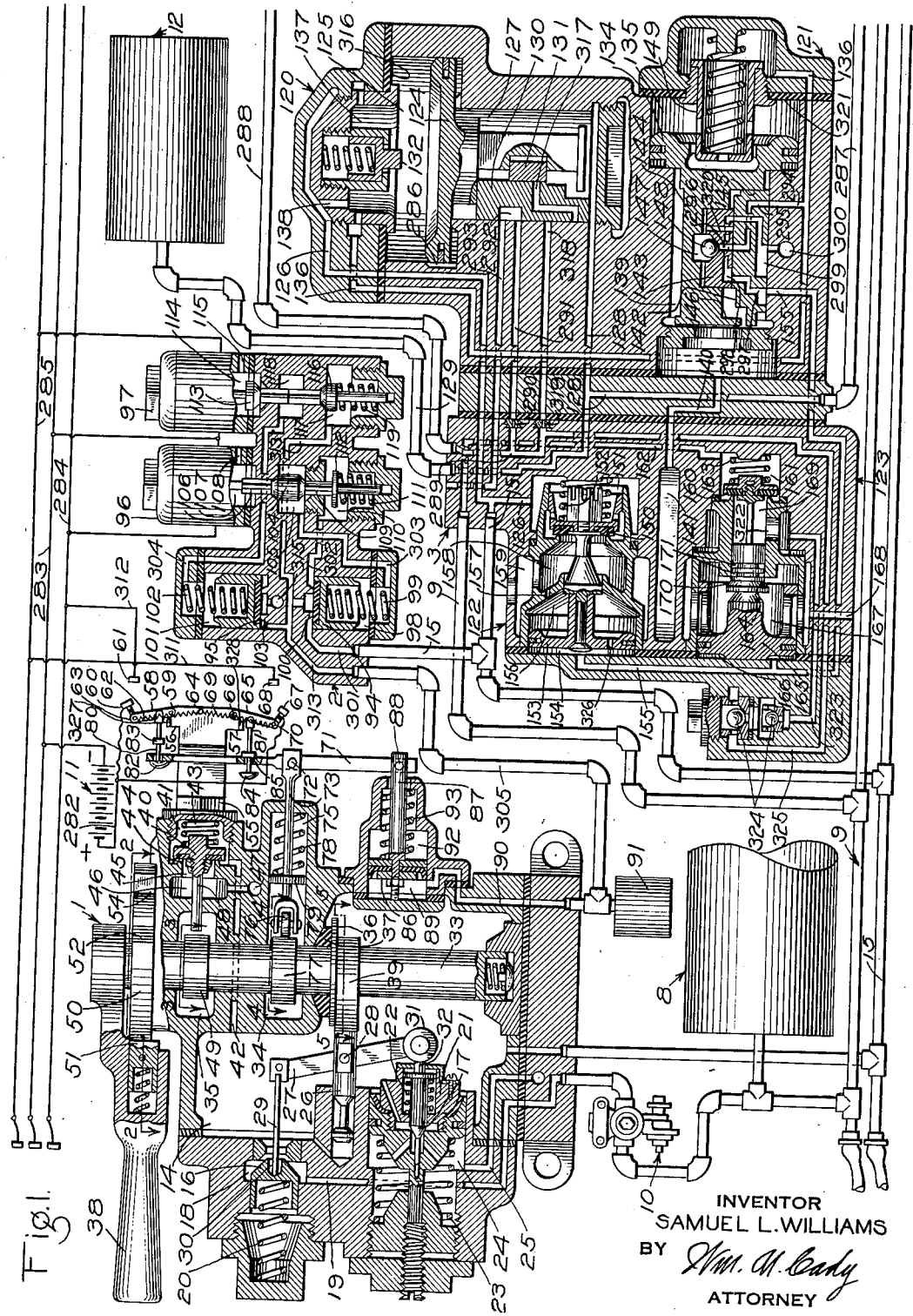

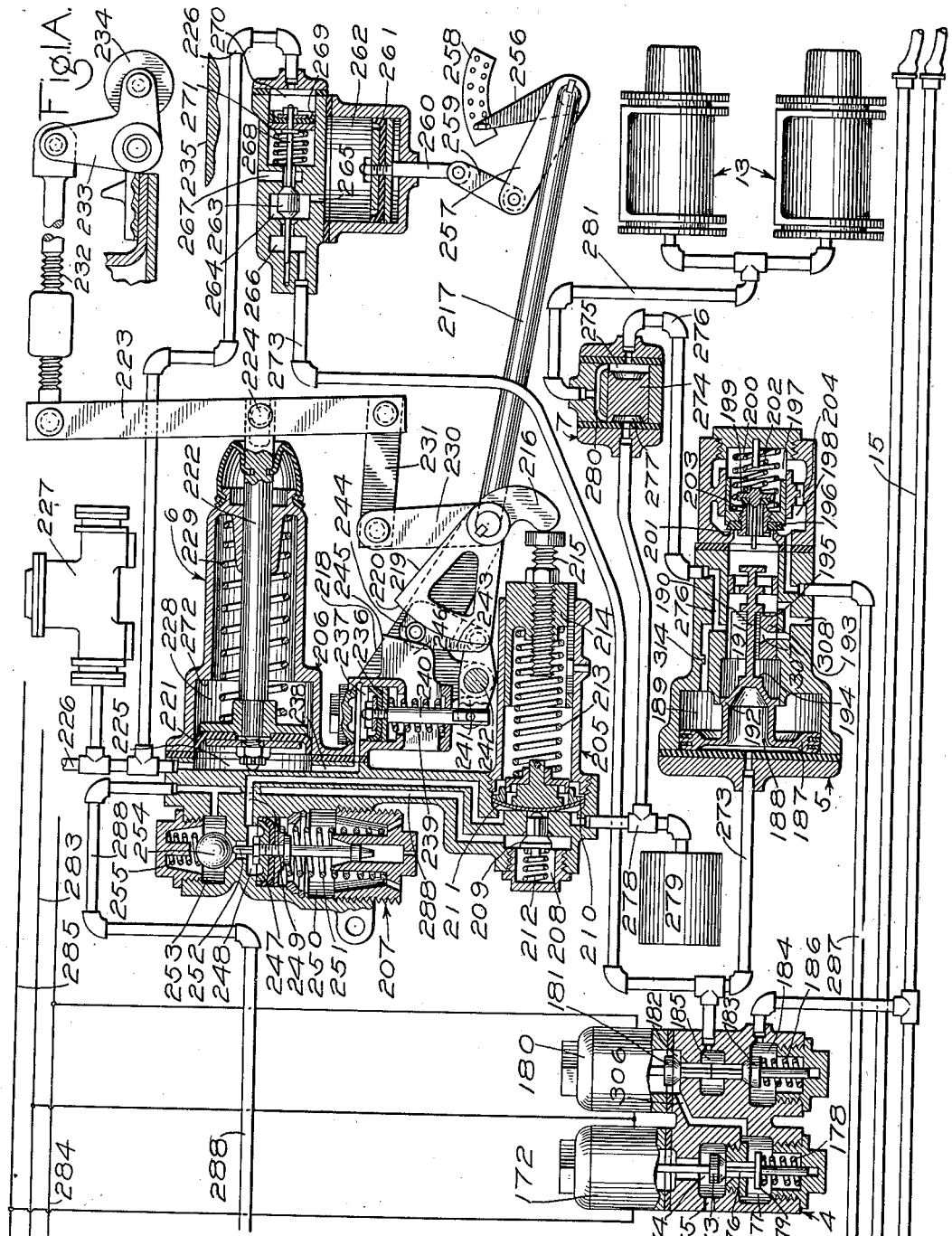

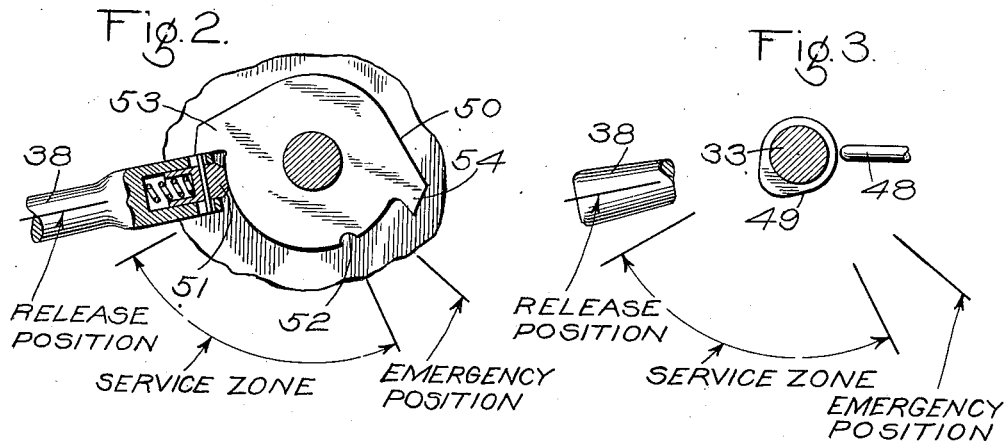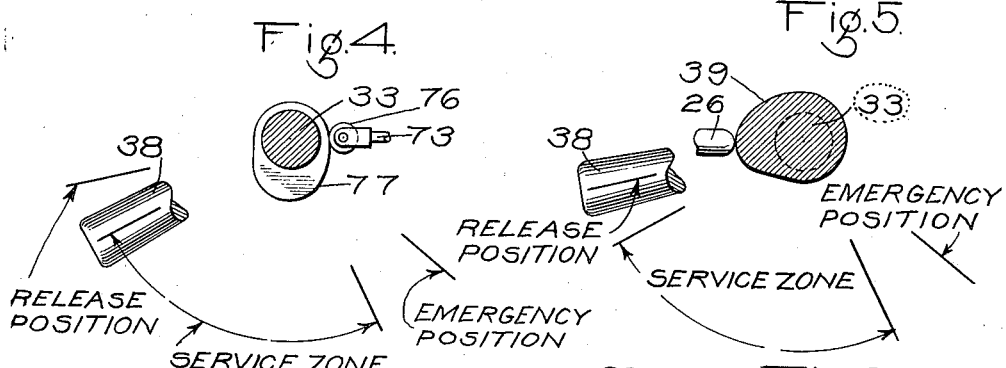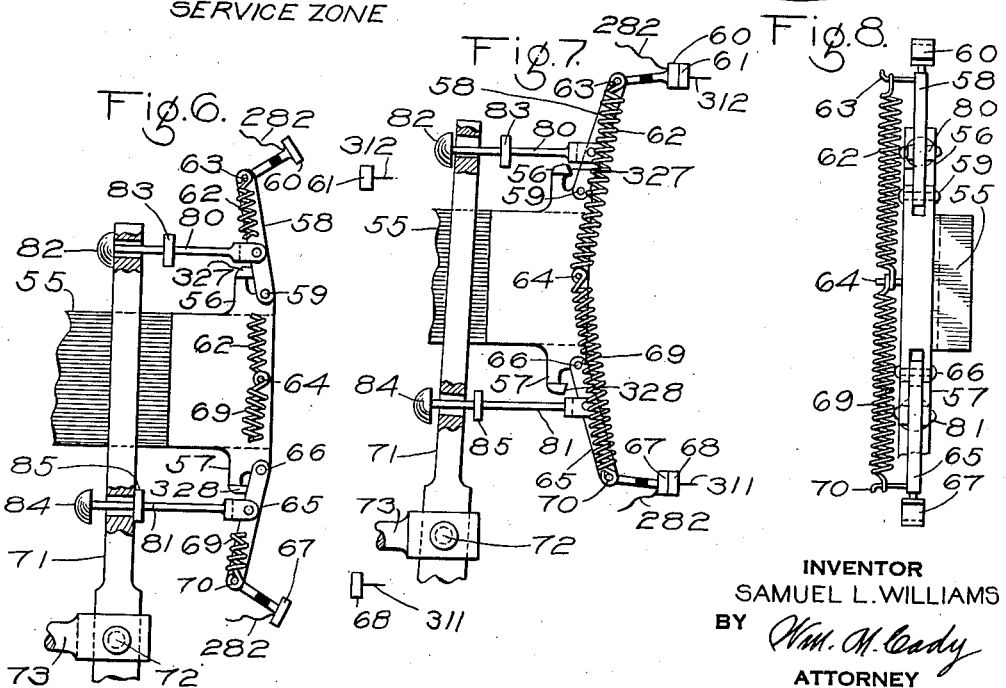

2,071,718

UNITED STATES PATENT OFFICE 2,071,718

VARIABLE LOAD BRAKE

Samuel L. Williams, New York, N. Y., assignor to The Westinghouse Air Brake Company, Wilmerding, Pa., a corporation of Pennsylvania Original application August 31, 1934, Serial No. 742,261. Divided and this application November 19, 1935, Serial No. 50,525

18 Claims. (Cl. 303—22)

This invention relates to brake systems for trains and more particularly to a brake system of the electropneumatic type, and is a division of my copending application, Serial No. 742,261, filed August 31, 1934.

One object of the invention is to provide improved means for regulating the degree of an application of brakes on a car according to the load on the car.

Another object of the invention is to provide in connection with a brake control system of the type embodying both pneumatic and electropneumatic brake control means, improved means for regulating, according to the load on a car, the degree of application of brakes effected upon operation of either of said control means.

Other objects and advantages will be apparent from the following more detailed description of the invention.

In the accompanying drawings; Figs. 1—1A are diagrammatic views, mainly in section, of an electropneumatic brake equipment embodying the invention and showing the apparatus adapted to be employed on the leading or control car of a train, said apparatus including that adapted to be employed on cars of the train other than the leading car, Fig. 1A being a continuation of Fig. 1; Figs. 2, 3, 4, and 5 are sectional views taken on the line 2—2, 3—3, 4—4 and 5—5, respectively, through the brake valve device shown in Fig. 1; Fig. 6 is an enlarged view of a switch shown in Fig. 1 associated with the brake valve device; Fig. 7 is a view similar to Fig. 6 but showing the switch in a different operating position; and Fig. 8 is another view of the switch shown in Figs. 6 and 7.

As shown in the drawings, the brake equipment adapted to be carried only on the control car of a train comprises a combined brake valve and brake switch device 1 and an electropneumatic control device 2, while the apparatus adapted to be employed on the control car as well as all other cars of the train comprises a pneumatic brake controlling valve device 3 for controlling the brakes on a car pneumatically, an electric brake controlling valve device 4 for controlling the brakes on a car electrically, a relay valve device 5 adapted to be controlled by the electric brake controlling valve device 4, a variable load mechanism 6 for controlling the degree of brake application effected by said electric brake controlling valve device 4 and pneumatic brake controlling valve device 3, and a double check valve device 7.

The control car apparatus may further comprise a main reservoir 8 which is connected to a main reservoir pipe 9 adapted to extend through the train, a feed valve device 10, and a source of electrical energy such as battery 11, while each car of the train is provided with the usual auxiliary reservoir 12 associated with the pneumatic brake controlling valve device 3, and the usual brake cylinders 13.

The brake valve portion of the combined brake valve device and brake switch device 1 is of the type known as the self-lapping type and comprises a casing having a chamber 14 connected at all times to a brake pipe 15 which extends through the train, and further comprises a brake pipe charging valve 16 for supplying fluid under pressure to chamber 14 and from thence to brake pipe 15, and a brake pipe discharge valve 17 for venting fluid under pressure from said chamber and brake pipe. The supply valve 16 is contained in a chamber 18 which is connected to a passage 19 leading to the feed valve device 10 and is subject to the pressure of a spring 20 adapted to urge said valve to its seat. The discharge valve 17 is carried by a movable abutment 21, and a spring 22 contained in said abutment is provided to urge said valve from its seat. The movable abutment 21 is subject on one face to the pressure of fluid in chamber 14 and on the opposite face to the pressure of an adjustable control spring 23 which is contained in a chamber 24, said chamber being at all times open to the atmosphere through an atmospheric vent passage 25.

A fulcrum member 26 is slidably mounted in a suitable bore in the casing of the brake valve device and a beam 27 is pivotally mounted, intermediate its ends, on a pin 28 carried by the fulcrum member 26. One end of beam 27 carries a push rod 29 the free end of which engages the supply valve 16 in a recess 30, while the other end of said beam carries a roller 31 which engages the stem 32 of the brake pipe discharge valve 17.

A rotatable stem 33 is suitably journalled in the brake valve casing and extends through chamber 14 and chambers 34 and 35 formed in said casing, and a collar 36 is provided on said stem within chamber 14 between which and the casing surrounding said stem is provided a gasket 37 to prevent leakage from chamber 14. A brake valve handle 38 is secured to said stem, outside of the casing, for turning said stem. The brake valve casing is provided with a quadrant 50, and the handle 38 is provided with a spring pressed latch 51 adapted to slide over said quadrant and drop into a notch 52 for defining the termination of a certain brake control zone, while the quadrant is provided at opposite ends with outstanding lugs 53 and 54 adapted to be engaged by said handle for defining the extreme positions of said handle, the various controlling positions of said handle being indicated in Fig. 2.

A cam 39 is provided on the stem 33 in chamber 14 in operating alignment with the fulcrum member 26 and is adapted upon turning said stem by handle 38 from release position through the service zone to vary the position of the fulcrum member 26, as will be evident from an inspection of Fig. 5, for controlling the operation of the charging valve 16 and discharge valve 17.

A brake pipe vent valve 40 is contained in a chamber 41 which is connected to a passage 42 leading to the brake pipe chamber 14, and a spring 43 also contained in chamber 41 acts on said vent valve to urge same into engagement with seat rib 44. The chamber 41 is open through an aperture 45 to a chamber 46 which in turn is open to the atmosphere through an atmospheric vent passage 47. A stem 48 carried by the vent valve 40 projects through aperture 45 and a suitable bore in the casing wall separating chambers 35 and 46, and into chamber 35, and a cam 49 carried by the stem 33 in chamber 35 is provided to unseat the vent valve 40 when the brake valve handle 38 is moved to emergency position, as will be noted from an inspection of Fig. 3 of the drawings.

The combined brake valve device and brake switch device 1 is provided with an outstanding lug 55 having oppositely disposed ears 56 and 57 carrying two toggle switches. One of the toggle switches comprises a switch arm 58 one end of which is pivotally mounted on a pin 59 in the ear 56, while the other end of said arm is provided with a contact 60 which is insulated from said arm and adapted to engage a fixed contact 61. One end of a spring 62 is connected to a pin 63 provided in the outer end of arm 58 while the other end of said spring is connected to a pin 64 in the lug 55, said spring being provided to snap the contact 60 to a circuit opening and a circuit closing position after the arm 58 is moved, by means to be hereinafter described, to a position in which the force of said spring acts at either one side or the other of fulcrum pin 59. The other toggle switch comprises a switch arm 65 one end of which is pivotally mounted on a pin 66 in the ear 57, while the other end is provided with a contact 67 insulated from said arm and adapted to engage a fixed contact 68. One end of a spring 69 is connected to a pin 70 provided in the outer end of arm 65 while the other end of said spring is connected to pin 64 in the lug, said spring being provided to snap the contact 67 to a circuit opening and circuit closing position as above described in connection with spring 62.

A lever 71 is provided to control the operation of the toggle switch arms 58 and 65. The lever 71 is pivotally mounted intermediate its ends on a pin 72 provided in the end of a fulcrum rod 73 which is supported by the casing of the combined brake valve and brake switch device 1, and slidably extends through a suitable bore in said casing into a chamber 75. A roller 76 is provided in the end of the fulcrum rod 73 in chamber 75 and engages a cam 77 on the rotatable stem 33, and a spring 78 surrounding rod 73 within the chamber 75 acts on a collar 79 on said rod urging the roller 76 against the cam 77.

The toggle switch arms 58 and 65 are operatively connected to the lever 71 at one side of the fulcrum pin 72 by means of rods 80 and 81, respectively, which are pivotally connected to the respective switch arms and freely extend through openings in the lever 71. The rod 80 is provided on its free end with a button 82 adapted to be engaged by one side of lever 71, while spaced from said button and on the opposite side of the lever 71 a collar 83 is provided adapted to be engaged by said opposite side of said lever, the difference between the space between adjacent faces of the button 82 and collar 83, and the thickness of the lever between said adjacent faces being provided to permit the snap movement of switch arm 58 due to the action of spring 62, as will be hereinafter described. The rod 81 is provided with a button 84 at its free end and a collar 85 spaced from said button and on the other side of the lever arm 71 to provide for snap operation of switch arm 65 by spring 69. Stop lugs 327 and 328 are provided on ears 56 and 57, respectively, to be engaged by switch arms 58 and 65, respectively, to define the circuit open position of said arms.

A piston 86 is contained in the casing of the combined brake valve and brake switch device 1 and is provided with a stem 87 which freely extends through a suitable bore in the casing and is pivotally connected by a pin 88 to the end of lever 71 opposite the end for controlling the toggle switches. The piston 86 has at one side a control chamber 89 connected to a passage 90 leading to a timing reservoir 91, and has at the opposite side a chamber 92 open at all times to the atmosphere by way of clearance space between the stem 87 and the casing. A spring 93 contained in chamber 92 is provided to urge the piston 86 towards the left hand.

The electropneumatic control device 2 is provided to supply fluid under pressure to and release fluid under pressure from the timing reservoir 91 and comprises an application control valve 94, a release control valve 95, an application magnet valve device for controlling the valve 94 and a release magnet valve device for controlling the valve 95. The application control valve 94 is in the form of a valve piston having at one side a chamber 98 which contains a spring 99 for urging said valve into engagement with a seat rib 100 formed in the casing. The release control valve 95 is also in the form of a valve piston having at one side a chamber 101 which contains a spring 102 for urging said valve into engagement with a seat rib 103 formed in the casing. The application magnet valve device comprises an application control magnet 96, a double beat valve 104 contained in a chamber 105 and having a fluted stem 106 extending through a bore in the casing into a chamber 107 which is vented to the atmosphere through an atmospheric passage 108, and having another fluted stem 109 extending through a bore in the casing into a chamber 110. A spring 111 is contained in the chamber 110 and acts on a plunger 112 urging said plunger against the end of the fluted stem 109. The release magnet valve device comprises a release control magnet 97, a valve 113 contained in a chamber 114 which is vented to the atmosphere through an atmospheric vent passage 115, and a valve 116 contained in chamber 117, both of said valves having a fluted stem extending through suitable bores in the casing and engaging in a chamber 118. A spring 119 is disposed in chamber 117, and acts on the valve 116 to urge said valve to its seat and at the same time urge valve 113 away from its seat.

The pneumatic brake controlling valve device 3 comprises a service valve device 120, an emergency valve device 121, a brake pipe vent valve device 122 and a high pressure valve device 123.

The service valve device 120 comprises a piston 124 having at one side a chamber 125 connected through chamber 137 and passage 138 to a passage 126 leading to brake pipe 15 and having at the opposite side a valve chamber 127 connected to a passage 128 which in turn is connected to a pipe 129 leading to auxiliary reservoir 12, said service valve device further comprising a main slide valve 130 and an auxiliary slide valve 131 contained in chamber 127 and adapted to be operated by piston 124. A spring pressed stop 132 projects into piston chamber 125 and is adapted to be engaged by the piston 124.

The emergency valve device 121 comprises a piston 134 having at one side a chamber 135 connected to a passage 136 leading to chamber 137 in the service valve device, which chamber is connected through a passage 138 to passage 126 leading to brake pipe 15. The piston 134 has at the opposite side a chamber 139 connected to a passage 140 leading to a quick action chamber 141 and containing a main slide valve 142 and an auxiliary slide valve 143 adapted to be operated by piston 134. For operating the slide valves 142 and 143, the piston 134 is provided with a stem 144 extending into chamber 139, said stem having a recess for receiving the auxiliary slide valve 143 and spaced shoulders 145 and 146 adapted to engage the main slide valve 142 for operating same. The stem 144 is provided with a recess which cooperates with a recess in the top of the auxiliary slide valve 143 to form a pocket 147 which contains a charging check valve 148 adapted to seat on said auxiliary slide valve. A movable spring pressed stop member 149 projects into piston chamber 135 and is adapted to be engaged by piston 134.

The brake pipe vent valve device 122 comprises a vent valve 150 contained in a chamber 151 which is connected to passage 126 leading to brake pipe 15. A spring 152 is contained in chamber 151 and acts to seat said vent valve, and a piston 153 is provided for unseating said vent valve, said piston having at one side a chamber 154 connected to a passage 155 leading to the emergency valve device 121, and having at the opposite side a chamber 156 which is open to the atmosphere at all times through a port 157, chamber 158 and passageway 159.

The high pressure valve device 123 comprises a valve 160 contained in a chamber 161 which is connected by a passage 162 to the main reservoir pipe 9, a spring 163 contained in said chamber for seating the valve 160, a plunger 164 for unseating said valve, and a piston 165 for actuating said plunger, said piston having at one side a chamber 166 connected to passage 155, and at the opposite side a chamber 167 which is connected to the atmosphere at all times by way of passageway 168. The valve 160 has a fluted stem 169 which slidably extends into a suitable bore in the casing into engagement with plunger 164, while the plunger is provided with a valve 170 around its outer end, and a plurality of peripheral grooves 171 below the valve, to prevent leakage past said plunger when the valve 160 is unseated.

The electric brake controlling valve device 4 comprises a release magnet 172, a release valve 173 adapted to be seated upon energization of said magnet and contained in a chamber 174 which is open to the atmosphere through a passage 175. A fluted stem 176 projects from said valve through a suitable bore in the casing into a chamber 177, and a spring 178 contained in said chamber acts on a plunger 179 to urge said valve from its seat. The electric brake controlling valve device further comprises an application magnet 180, a valve 181 contained in a chamber 182 and a valve 183 contained in a chamber 184. Each valve 181 and 183 is provided with a fluted stem which engage one another in a chamber 185, and a spring 186 contained in chamber 184 acts on valve 183 urging valve 183 to its seat and valve 181 away from its seat.

The relay valve device 5 comprises a piston 187 having at one side a control chamber 188 and at the opposite side a chamber 189. A stem 190 projects from said piston into a valve chamber 191, and a baffle piston 192 is provided on said stem separating chambers 189 and 191. A brake cylinder release valve 193 is disposed in the valve chamber 191 between spaced shoulders 194 and 195 on the piston stem 190 and is adapted to be operated by the piston 187. An application valve 196 is disposed in a chamber 197 for controlling communication from a fluid pressure supply chamber 198 to valve chamber 191, and an application valve pilot valve 199 is mounted within the application valve 196 for controlling communication from chamber 197 to chamber 191, the application valve 196 and pilot valve 199 being arranged in axial alignment with the end of piston stem 190 and adapted to be successively unseated by said stem. A spring 200 is provided in chamber 197 and acts on the application valve 196 urging same into engagement with a seat rib 201, while a spring 202, within spring 200, acts on pilot valve 199 urging said pilot valve into engagement with a seat rib 203 provided in the application valve 196. A passage containing a restriction 204 provides a communication from chamber 198 to chamber 197.

The variable load mechanism 6 comprises a brake cylinder pressure limiting valve device 205, adjusting mechanism 206, and a by-pass valve device 207.

The limiting valve device 205 comprises a casing having a chamber 208 containing a valve 209 which is provided with a fluted stem extending through a suitable bore in said casing and into a chamber 210 at one side of a flexible diaphragm 211 which engages said stem. A spring 212 in chamber 208 acts on the valve 209 urging same to its seat, while a spring 213 acts on the diaphragm 211 for urging the valve 209 away from its seat. A movable plunger 214 is slidably mounted in a suitable bore in the casing and engages one end of spring 213, and an adjusting screw 215 is carried by said plunger and is adapted to be engaged by an arm 216 secured to a shaft 217 which is rotatably carried in a bracket 218 formed integral with the casing.

Also secured to the shaft 217 is an arm 219, which, at its free end, is provided with a curved surface 220 in the form of an arc of a circle.

The adjusting mechanism 206 comprises a casing containing a strut piston 221 having a stem 222 which extends through an opening in the casing and which, adjacent its outer end, is operatively connected to a lever 223 by a pin 224. The piston 221 has a chamber 225 at one side which is constantly connected to a pipe 226 through which fluid under pressure is adapted to be supplied for effecting the operation of a door engine 227 to open the door of a car. At the opposite side of piston 221 is a chamber 228 containing a spring 229 provided to urge the piston 221 to the normal position, as shown in the drawings.

An arm 230 is also secured to the shaft 217, the free end of said arm being connected to one end of the lever 223 by a link 231, while the other end of the lever 223 is connected to one end of a tie rod 232 the other end of which connects to one arm of a bell crank lever 233 which is pivotally mounted on the body of the vehicle. The other arm of the bell crank lever 233 is provided with a roller 234 adapted upon clockwise rotation of said lever to engage a portion, such as the spring plank 235, of a car truck.

The casing further contains a locking piston 236 having at one side a chamber 237 connected to a passage 238 leading to the strut piston chamber 225, a spring 239 being provided to act on the other side of said piston to urge same to the locking position, as shown in the drawings.

The piston 236 is provided with a stem 240 which is connected to one end of a lever 241 which is fulcrumed intermediate its ends on a pin 242 carried by the bracket 218. A link 243 is connected to the other end of lever 241 and a friction locking element such as roller 244 is carried by said link and disposed between the curved surface 220 of arm 219 and a surface 245 of a lug 246 carried by the bracket 218, surface 245 being so arranged with respect to the curved surface 220 that the roller 244, upon downward movement, acts as a wedge to lock the arm 219 in an adjusted position.

The by-pass valve device 207 comprises a movable abutment 247 having a chamber 248 at one side connected to a passage 249 leading to diaphragm chamber 210, and having a chamber 250 at the opposite side containing an adjustable spring 251 which acts on said abutment to urge same to the normal position, as shown in the drawings. The abutment 247 is provided with a pin 252 which extends through an aperture in the casing into a chamber 253 wherein, said pin normally engages and holds unseated a valve 254 which is subject to the opposing pressure of a spring 255 acting to seat said valve.

Also secured to the shaft 217 are arms 256 and 257, the arm 256 being movable along a contact plate 258 for varying the resistance in a power circuit of the control car according to the load carried by said car, while the arm 257 is connected by a link 259 to the stem 260 of a volume varying piston 261 which is provided at one side with chamber 262 the volume of which is adapted to be varied according to the load condition of the car.

A double beat valve 263 is contained in a chamber 264 which is connected to a passage 265 leading to chamber 262 and is adapted to control communication between chamber 264 and chambers 266 and 267. A stem 268 connects the double beat valve 263 to a piston 269 having at one side a chamber 270 which is connected to the door opening pipe 226, and having at the opposite side a chamber containing a spring 271 acting on said piston urging same to the normal position, as shown in the drawings.

The adjustment of the variable load mechanism according to the load on a car is accomplished in the following manner.

When fluid under pressure is supplied to pipe 226 to effect the operation of door engine 227 to open the door of the car, in the usual well known manner, fluid under pressure also flows from said pipe to the strut piston chamber 225 and from thence through passage 238 to the locking piston chamber 237, and also from pipe 226 to piston chamber 270. Fluid under pressure thus applied to the strut piston 221 moves said piston outwardly against spring 229 into engagement with a shoulder 272 in the casing, and thereby rotates lever 223 about its fulcrum connection with link 231 until the roller 234 engages the spring plank 235 on the truck. When sufficient pressure has been built up in chamber 237 on the locking piston 236 to overcome spring 239, said piston is moved downwardly which actuates lever 241 to move roller 244 out of locking engagement with surfaces 220 and 245, and at substantially the same time, the piston 269 is moved against spring 271 and seats the double beat valve 263 in its left hand position in which the volume piston chamber 262 is opened to the atmosphere through passage 265, chamber 264 and atmospheric chamber 267.

With the variable load mechanism in the condition just described, the limiting valve spring 213 acts through plunger 214, screw 215, arms 216 and 230, link 231, lever 223, tie rod 232 and the bell crank lever arms to hold the roller 234 against the car spring plank 235. Now if the load on the car is increased, the body of the car sinks toward the spring plank 235 and thereby operates the bell crank lever arm 233 to turn the shaft 217 in a clockwise direction, thereby operating the arm 216 to move the plunger 214 inwardly and compress or increase the pressure of the limiting valve spring 213. This rotation of shaft 217 also acts through arm 257, link 259 and stem 260 to move the piston 261 upwardly and thereby decrease the volume of chamber 262. In case there is a reduction in the load carried by the car and the car body moves away from the spring plank 235, the limiting valve spring 213 expands in order to maintain roller 234 in engagement with spring plank 235 and in so doing the pressure of said spring is reduced and the consequent rotation of shaft 217 in a counterclockwise direction pulls the piston 261 downwardly thereby increasing the volume of chamber 262. In other words the pressure of the limiting valve spring 213 is increased upon an increase in car load and reduced upon a reduction in car load, while the volume of chamber 262 is reduced upon an increase in car load and increased upon a reduction in car load, and it will be further noted that, since the arm 219 is secured to shaft 217, its position also changes according to the car load.

When the car has been loaded, the pipe 226 is vented to the atmosphere to permit the door engine 227 to operate to close the door of the car.

With the pipe 226 thus vented to the atmosphere, the piston chambers 237, 225 and 270 are consequently vented. It will here be noted that the pressure of spring 239 is such that it will cause piston 236 to move upwardly before the strut piston 221 begins to move toward the left hand. As the locking piston 236 is moved upwardly by spring 239, the lever 241 is rotated and acts through the link 243 to pull the roller 244 into locking engagement with surfaces 220 and 245. Then, when the pressure in the strut piston chamber 225 is reduced sufficiently, the pressure of spring 229 returns the strut piston 221 to its extreme left hand or normal position, and in so doing, operates the stem 222, lever 223, tie rod 232 and bell crank lever in such a manner that the roller 234 is lifted out of engagement with the car spring plank 235.

With the roller 244 in locking engagement with surfaces 220 and 245 and the strut piston 221 returned to its normal position, as above described, the outward pressure of the limiting valve spring 213 acting upon plunger 214, screw 215 and arm 216 will not affect the adjustment of said spring.

When the pressure in piston chamber 270 is reduced sufficiently, the pressure of spring 271 moves said piston and thereby the double beat valve 263 to their right hand or normal position, as shown in the drawings, and in this position, the piston chamber 262 is connected through passage 265, chamber 264 and past the double beat valve 263 to chamber 266 which is connected to a pipe 273 leading to chamber 185 in the electric brake controlling valve device 4 and to the piston chamber 188 in the relay valve device 5.

The double check valve device 7 is provided for controlling communication between the relay valve device 5 and the brake cylinders 13, and the variable load mechanism 6 and said brake cylinders, and comprises a casing containing a piston valve 274 having at one side a chamber 275 connected to a pipe 276 leading to valve chamber 191 of the relay valve device, and having at the opposite side a chamber 277 connected to a pipe 278 leading to diaphragm chamber 218 in the variable load mechanism 6. A volume reservoir 279 is connected to the pipe 278. The double check valve device is also provided with a passage 280 connected to a pipe 281 leading to the brake cylinders 13, and adapted to be connected to chambers 275 and 277, according to the position of the piston valve 274.

One terminal of the battery 11 is connected to a wire 282 which is connected to the movable contacts 60 and 67 of the toggle switches on the combined brake valve and brake switch device 1, while the other terminal of the battery is connected to a return wire 283 which extends through the train and to which is connected all of the magnets 96, 97, 172 and 189. The fixed contacts 61 and 68 of the toggle switches are connected to an application wire 284 and a release wire 285, respectively, which wires extend through the in parallel to the application wire 284, and the in parallel to the application wire 284, and the magnets 97 and 172 are connected in parallel to the release wire 285.

In operation, when the combined brake valve and brake switch device 1 is in the release position, as shown in Figs. 1 and 2, the toggle switches are open, and consequently, the circuits to all magnets in the train are open and the magnets deenergized.

In the release position of the combined brake valve and brake switch device 1, the cam 49 is positioned, as shown in Figs. 1 and 3 of the drawings, to permit spring 43 to seat vent valve 40, the cam 77 is positioned, as shown in Fig. 1 of the drawings, to permit spring 78 acting on collar 79 to maintain fulcrum rod 73 and therefore lever 71 in the innermost position, and the cam 39 is positioned to hold member 26 in its outermost position, as shown in Figs. 1 and 5 of the drawings.

When the cam 39 and therefore fulcrum member 26 are positioned as above described, the brake pipe discharge valve 17 is seated upon its seat in abutment 21 against the opposing pressure of spring 22, and the brake pipe charging valve 16 is unseated against the opposing pressure of spring 20.

Fluid under pressure is supplied to the main reservoir 8 in the usual, well known manner. Fluid under pressure from the main reservoir flows to the main reservoir pipe 9 which extends through the train, and from said pipe fluid under pressure flows to the feed valve device 10 and the pneumatic brake controlling valve device 3.

The feed valve device 10 operates in the usual manner to reduce the pressure of fluid supplied from the main reservoir to the pressure desired to be carried in the brake pipe 15, and to supply fluid at this reduced pressure to the brake pipe charging valve chamber 18, by way of passage 19. From chamber 18 fluid at feed valve pressure flows past the charging valve 16 to chamber 14 and from thence to brake pipe 15 until the brake pipe is charged with fluid at the pressure supplied by the feed valve device 10.

The pressure of fluid thus obtained in chamber 14 acts upon the movable abutment 21 and moves said abutment towards the left hand against the pressure of the regulating spring 23. This movement of the abutment 21 relieves pressure on one end of the beam 27 which permits the pressure of spring 20 acting through the charging valve 16 on the other end of said beam, to move said charging valve toward its seat. The pressure of spring 23 is preferably so adjusted with respect to the pressure supplied by the feed valve device 10 however, that when the pressure in chamber 14 and brake pipe 15 is increased to the degree supplied by the feed valve device, the abutment 21 ceases moving toward the left hand in a position in which the charging valve 16 is still partially unseated. By this construction, the feed valve device 10 acts to maintain the pressure in brake pipe 15 against leakage, when the brakes are released.

Fluid under pressure supplied to the brake pipe 15 flows to passage 126 in the pneumatic brake controlling valve device 3, and through said passage to the vent valve chamber 151, and from said passage through passage 138 to chamber 137 which is open to piston chamber 125 of the service valve device 120, and from chamber 137 through passage 136 to piston chamber 135 of the emergency valve device 121.

With the parts of the service valve device 120 in the release position, as shown in the drawings, fluid under pressure flows from chamber 125 through a feed groove 286 to valve chamber 127 and from thence through passage 128 to pipe 129 leading to the auxiliary reservoir 12, thereby charging said auxiliary reservoir. Fluid at the pressure in the auxiliary reservoir 12 flows from passage 128 to a pipe 287 leading to the application valve chamber 198 in the relay valve device 5, and from said chamber through the restricted passage 204 to chamber 197 at the spring side of the application valve 196. With the application piston 187 in the normal or brakes released position, as shown in the drawings, the springs 200 and 202 in addition to the pressure of fluid in the spring chamber 197 acts to hold the application valve 196 and pilot valve 199 against the seat ribs 201 and 203, respectively.

With the service valve device in the release position, just described, chamber 277 at the left hand side of the piston valve 274 in the double check valve device 7 is vented to the atmosphere along with the volume reservoir 279 by way of pipe 278, diaphragm chamber 210, passage 249, and past the ball valve 254 in the variable load mechanism 6 to pipe 288 leading to passage 289 in the pneumatic brake controlling valve device 3, and from said passage through a choke plug having an opening 290 for controlling the rate of release of brakes, to a passage 291, and from thence through a cavity 292 in slide valve 130 to an exhaust passage 293 leading to the atmosphere.

With the parts of the emergency valve device 121 in the normal or release position, as shown in the drawings, fluid supplied from the brake pipe to passage 136 flows through a passage 294 to the seat of slide valve 142, and from said passage through a port 295 in said slide valve and a registering passage 296 in the auxiliary slide valve 143 to chamber 147 which is open to valve chamber 139. Fluid thus supplied to chamber 139 flows through passage 140 to the quick action chamber 141 thus charging said chambers to brake pipe pressure.

With the emergency valve device 121 in the release position, the vent valve piston chamber 154 and the high pressure valve piston chamber 166 are both vented to the atmosphere by way of passage 155, port 297 in the emergency slide valve 142, cavity 298 in the auxiliary slide valve 143, port 299 in said slide valve 142 and exhaust passage 300 which leads to the atmosphere.

With the vent valve piston chamber 154 vented to the atmosphere, the vent valve 150 is held seated by the combined pressures of spring 152 and fluid from the brake pipe in chamber 151, while with the high pressure valve piston chamber 166 vented to the atmosphere, the high pressure valve 160 is held seated by the combined pressures of spring 163 and fluid at main reservoir pressure which is supplied from the main reservoir pipe 9 to chamber 161 by way of passage 162.

Fluid under pressure from brake pipe 15 flows to the electropneumatic control device 2, and through a passage 301 in said device to the seated area of the application control valve 94 outside of seat rib 100, and from thence through passage 302 to chamber 110. With the application control magnet 96 deenergized, spring 111 holds the double beat valve 104 seated in its upper position, so that fluid flows from chamber 110 to chamber 105 and from said chamber through passage 303 to chamber 98 at the spring side of the application control valve 94, which valve is thus held seated against seat rib 100 by the combined pressures of fluid and spring 99 in chamber 98.

With the release control magnet 97 deenergized, the valve 116 is seated and the valve 113 is unseated due to the action of spring 119. With the valve 113 unseated, the chamber 101 at the spring side of the release control valve 95 is vented to the atmosphere through passage 304, chamber 118, past the valve 113 and through the atmospheric exhaust passage 115, and as a consequence, the piston chamber 89, in the combined brake valve and brake switch device 1, and the timing reservoir 91 are both at atmospheric pressure, being vented through pipe 305 and the slight clearance space provided between the release control valve 95 and the casing, to the vented chamber 101.

Fluid under pressure is supplied from the brake pipe 15 to chamber 184 in the electric brake controlling valve device 4. Both the application magnet 180 and release magnet 172 of this device are normally deenergized, which permits spring 186 to seat valve 183 and unseat valve 181, and spring 178 to unseat valve 173. With these valves in this condition, the relay valve piston chamber 188 and the variable volume chamber 262 of the variable load mechanism 6 are both vented to the atmosphere by way of pipe 273, chamber 185, past the unseated valve 181, through passage 306 to chamber 177, thence past the unseated valve 173, through chamber 174 and to the atmosphere through the exhaust passage 175.

When the relay valve piston chamber 188 is thus open to the atmosphere, the piston 187 and the exhaust valve 193 assume the release position, as shown in the drawings, in which position the valve chamber 191 is vented to the atmosphere through a port 307 in said exhaust valve and past one end of said exhaust valve to a passage 308 leading to the atmosphere. Chamber 275 at the right hand side of the check valve piston 274, being connected through pipe 276 to the valve chamber 191 of the relay valve device 5, is thus normally vented to the atmosphere, and if the double check valve piston 274 is in the position shown in the drawings, the brake cylinders 13 are also normally vented to the atmosphere by way of the relay valve device 5 since said cylinders are connected through pipe 281 and passage 280 in the double check valve device to the vented chamber 275. If the double check valve 274 is in its right hand position, then passage 280 is open to chamber 277 and therefore vented by way of said chamber through the variable load mechanism 6 and service valve device 120 in the manner hereinbefore described.

With the brake system fully charged with fluid under pressure, and with the brakes released and the variable load mechanism 6 properly adjusted for the load on the car, as above described, if it is desired to effect a service application of the brakes, the handle 38 of the combined brake valve and brake switch device 1 is moved from the release position into the service zone. It will here be noted that in the service zone of handle 38, the apparatus operates to apply the brakes electropneumatically, as well as purely pneumatically, the latter operation being effective only in case the electropneumatic operation fails, however, as will be more fully described hereinafter.

Upon movement of the handle 38 into the service zone, the cam 77 is turned and acts through the roller 76 to move fulcrum rod 73 and lever 71 outwardly toward the right hand a distance depending upon the degree of movement of said handle into the service zone. During this movement of rod 73, spring 93 acts to hold the automatic lapping piston 86 in a fixed position, so that the lever 71 turns in a clockwise direction about the pin 88.

The lever 71 in turning clockwise about the fulcrum pin 83 first engages the collar 85 on the toggle switch contact operating rod 81 and turns the switch arm 65 in a counterclockwise direction about the pin 66 until the spring 69 acts on the opposite side of said pin when said spring acts to snap the contact 67 into engagement with fixed contact 68, thereby connecting the positive terminal of the battery 11 through wire 282, contacts 67 and 68 and wire 311 to the release train wire 285. At substantially the same time as the toggle switch arm 65 is operated as just described, the lever 71 engages the collar 83 on the operating rod 80 and operates said rod to turn the contact arm 58 in a clockwise direction about the pin 59 until the spring 62 acts on the opposite side of said pin and snaps the contact 60 into engagement with the fixed contact 61 thereby connecting the positive terminal of battery 11 to a wire 312 leading to the application train wire 284

This circuit closing position of the toggle switch arms 58 and 65 is shown in Fig. 7 of the drawings.

The release magnet 172, being connected across the release train wire 285 and return train wire 283, which leads to the negative pole of battery 11, is energized when the toggle switch contact 67 engages contact 68 and consequently operates to seat the valve 173, while the application magnet 180, which is connected across the application train wire 284 and return wire 283, is energized when the toggle switch contact 60 engages contact 61, and consequently operates to seat valve 181 and unseat valve 183.

The unseating of valve 183 permits fluid under pressure to flow from brake pipe 15 through chamber 184 to chamber 185 and from thence through pipe 273 to the variable load chamber 262 and relay valve application piston chamber 188.

The pressure of fluid thus supplied to the application piston chamber 188 moves the piston 187 towards the right hand which first shifts the exhaust valve 193 on its seat to lap the atmospheric exhaust passage 308. Upon further movement of the application piston 187, the end of the piston stem 190 first engages and unseats the pilot valve 199 and then engages and unseats the application valve 196. The unseating of the pilot valve 199 is adapted to vent fluid under pressure from chamber 197 at a rate exceeding the rate of supply through the restricted passage 204, and thereby reduce the seating pressure on the application valve, so that after the pilot valve 199 is unseated a slight increase in the pressure in chamber 188 will operate the application piston 187 to unseat the application valve.

With the application valve 196 unseated, fluid flows from the auxiliary reservoir 12 through pipe 129, passage 128 in the pneumatic brake controlling valve device 3, pipe 237, chamber 198, past the application valve to chamber 191 and from thence through pipe 276 to chamber 275 at the right hand side of the double check valve piston 274. The pressure of fluid thus obtained in chamber 275 is adapted to shift the double check valve 274 to its left hand position and thereby establish communication from said chamber to passage 280 through which fluid from the auxiliary reservoir is adapted to flow to pipe 281 and from thence to the brake cylinders 13 and thereby apply the brakes.

The release control magnet 97 and application control magnet 96 are connected to the same respective train wires and are adapted to operate simultaneously with the release magnet 172 and application magnet 180. The energization of the release control magnet 97 seats valve 113 and unseats valve 116 thereby connecting chamber 101 at the spring side of the release control valve 95 through passage 304, chamber 118, past valve 116 to chamber 117 and from thence through passage 313 to the opposite side of said control valve outside of seat rib 103 and to the face of the application control valve 94 within the seat rib 100. The energization of the application control magnet 96 shifts the double beat valve 104 to its lower seated position thereby closing communication between the opposite sides of the application control valve 94, and at the same time venting fluid under pressure from chamber 98 at the spring side of said application control valve through passage 303, past the double beat valve 104 to chamber 107 and from thence to the atmosphere through passage 108.

With the spring chamber 98 vented to the atmosphere, fluid at brake pipe pressure acting on the opposite face of the application control valve, outside of the seat rib 100, moves said valve away from the seat rib 100, against the opposing pressure of spring 99, and thereby establishes a communication through which fluid from the brake pipe 15 flows past said valve to passage 313 and from thence through pipe 305 to timing reservoir 91 and chamber 89 at the left hand side of the lapping piston 86. Fluid under pressure from passage 313 also flows past the unseated release valve 116 to chamber 118 and from thence through passage 304 to chamber 101 at the upper side of the release control valve 95 so as to equalize the fluid pressures acting on the opposite sides of said release control valve and thereby permit spring 102 to maintain said valve in engagement with seat rib 103.

The pressure of fluid thus obtained in the timing reservoir 91 and chamber 89 moves the piston 86 against the opposing pressure of spring 93 and thereby rotates the lever 71 about the pin 72 thereby causing said lever to first engage with button 82 on the rod 80 and then pull said button and rod toward the left hand thereby rotating the contact arm 58 in a counterclockwise direction until the action of spring 62 is in a line on the left hand side of the pivot pin 59, at which time the contact arm and contact 60 are snapped to their normal or open circuit position. This operation pulls the contact 60 away from contact 61 and thereby opens the circuit to the application train wire 284 and consequently causes deenergization of the application control magnet 96 and application magnet 180.

The deenergization of the application control magnet 96 permits spring 111 to seat the double beat valve 104 in the upper position, which permits fluid under pressure to equalize from the seat side of the application control valve 94 through passage 302, chambers 110 and 105 and passage 303 into chamber 98 at the spring side of said valve, whereupon spring 99 shifts said valve into engagement with seat rib 100 to close communication from the brake pipe passage 301 to passage 313 leading to the timing reservoir, so that the supply of fluid to said reservoir and the lapping piston chamber 89 is cut off and the fluid under pressure in said reservoir and chamber is bottled up. As a result, the movement of the lapping piston 86 ceases upon the cessation of the increase in pressure in chamber 89, and this occurs immediately following the operation of lever 71 and the toggle switch arm 58 to move contact 60 away from contact 61 to open the application train wire circuit.

When the application magnet 180 is deenergized by operation of the lapping piston 86 as above described, spring 186 seats valve 183 and thereby cuts off the supply of fluid from brake pipe 15 to the application piston chamber 188 and variable load chamber 262. The valve 181 is unseated upon the seating of valve 183 and opens communication from chamber 185 to chamber 182 which is connected through passage 306 to chamber 177, but with the release magnet 172 energized and valve 173 seated fluid under pressure is bottled up in the application piston chamber 188 and variable load chamber 262.

As fluid under pressure is supplied from the auxiliary reservoir 12 by way of the relay valve device 5 and double check valve device 7 to the brake cylinders 13, fluid flows from passage 276 in the relay valve device through a passage containing a restriction 314 to chamber 189 at the right hand side of the application piston 187, and the consequent build up of pressure in chamber 189 is just slightly behind the build up of the control pressure in chamber 188, so that while the relay valve device is supplying fluid under pressure to the brake cylinders 13, the piston 187 will maintain the application valve 196 unseated. After the supply of fluid to the control chamber 188 is cut off and the fluid under pressure therein bottled up, as above described, the piston 187 maintains the application valve 196 open until the pressure in chamber 189 is increased to a degree sufficient to overcome the control pressure in chamber 188, at which time the application piston 187 is moved towards the left hand and permits springs 200 and 202 to seat the application valve 196 and pilot valve 199 and thereby cut off the supply of fluid to the brake cylinders 13. The whole equipment is now in lap condition.

It will be noted, upon an inspection of Fig. 2 of the drawings, that the combined brake valve and brake switch device 1 is of the type having a service zone, and when the handle 38 is moved to any position in said zone, a service application of the brakes will be obtained in the manner above described, the degree of application varying according to the position to which the handle is moved, the maximum service application being obtained when the handle 38 is moved to the extreme right hand end of the zone.

If the application of brakes effected in the manner above described is less than the maximum or full service application, then in order to increase the degree of application, the handle 38 is turned further towards the right hand, as viewed in Fig. 2 of the drawings, according to the degree of increase in brake application desired.

This further movement of the handle 38 operates the cam 77 to move the fulcrum rod 73, and thereby the pin 72 upon which the lever 71 is fulcrumed, further towards the right hand. At this time the position of the lapping piston 86 is fixed by the opposing and equal pressures of spring 93 and fluid in chamber 89 so that the lever 71 fulcrums on pin 88 and consequently operates the application toggle switch arm 58 to again connect the positive terminal of battery 11 to the application train wire 284, whereupon the application magnet 180 is again energized and operates to supply fluid under pressure to the application piston chamber 188 and variable load chamber 262 and thereby cause the relay valve device 5 to operate and supply fluid under pressure to the brake cylinders 13 to increase the degree of application. The reenergization of the application control magnet 96 causes the application valve 94 to again open to increase the pressure in timing reservoir 91 and lapping piston chamber 89, whereupon the lapping piston is again moved toward the right hand against the opposing and increasing pressure of spring 93 until the toggle switch arm 58 is again operated to open the circuit to the application train wire 284 and thereby cause the apparatus to again operate to lap the brakes.

The brake system may be operated in the manner above described to graduate on an application of the brakes in such increments as desired, or if desired, the handle 38 may be moved to the extreme right hand end of the service zone, as viewed in Fig. 2, and the maximum service application of the brakes will be obtained in a single step.

In order to release the brakes electrically, after an application, the handle 38 is moved toward the left hand, as viewed in Fig. 2. This turns the cam 77 in such a direction as to permit spring 78 acting on the collar 79 of fulcrum rod 73 to move said rod and the pin 72, upon which lever 71 is fulcrumed, toward the left hand. Since at this time the lapping piston 86 is held in a fixed position by the opposing and equal pressures of spring 93 and fluid in chamber 89, the lever 71 pivots on pin 88 and turns in a counterclockwise direction. With the brake system in lap condition the toggle switch arm 58 is in the circuit open position, so that the turning of lever 71 engages button 84 on rod 81 and pulls said rod and acts to turn the release toggle switch arm 65 in a clockwise direction about the pin 66. As soon as the line of action of spring 69 is thereby transferred to the left hand side of pivot pin 66, said spring acts to snap the arm 65 to its normal position, as shown in Figs. 1 and 6. This moves contact 67 out of engagement with contact 68 thereby opening the circuit to the release train wire 285 and through the release magnet 172 and release control magnet 97.

The consequent deenergization of the release magnet 172 permits spring 178 to unseat valve 173, and with the application magnet 180 deenergized, fluid under pressure is released from the application piston chamber 188 and variable load chamber 262 by way of pipe 273, chamber 185, past valve 181, through chamber 182, passage 306, chamber 177, past valve 173, through chamber 174 and to the atmosphere through passage 175.

The consequent reduction in pressure in the application piston chamber 188, permits brake cylinder pressure acting in chambers 189 and 191 to move the application piston 187 toward the left hand and thereby shift the exhaust valve 193 so as to open communication from valve chamber 191 through port 307 in said exhaust valve and past the end thereof to passage 308 leading to the atmosphere. With the exhaust valve 193 in this position, fluid under pressure is released from the brake cylinders 13 through pipe 281, passage 289 and chamber 275 in the double check valve device, and from said chamber through pipe 276, valve chamber 191 and atmospheric passage 308, thereby releasing the brakes.

The deenergization of the release control magnet 97 permits spring 119 to seat valve 116 and unseat valve 113 which permits venting of fluid under pressure from the chamber 101 at the spring side of the release valve 95, by way of passage 304, chamber 118, past the valve 113 to chamber 114 and to the atmosphere through the atmospheric exhaust passage 115. When the pressure of fluid in spring chamber 101 is thus reduced sufficiently, fluid at the pressure in timing reservoir 91 and chamber 89, acting on the lower face of the release valve 95 outside of seat rib 103, moves the release valve away from the seat rib 103 and thereby establishes a communication between passage 313 and an atmospheric exhaust passage 315, through which fluid under pressure is released from said reservoir and said chamber.

As the pressure of fluid in chamber 89 is thus relieved on the lapping piston 86, spring 93 moves said piston toward the left hand and consequently rotates lever 71 in a clockwise direction about the fulcrum pin 72.

If the handle 38 and therefore fulcrum rod 73 and pin 72 are returned to the release or normal position, then the clockwise rotation of lever 71 ceases, when the lapping piston 86 assumes its normal position, and at just about the time said lever engages the collar 85 on the rod 81, so that the toggle switch arm 65 remains in its normal circuit opening position, and the release magnet 172 and release control magnet 97 remain deenergized so as to permit a complete release of brakes and a complete venting of fluid under pressure from the timing reservoir 91 and piston chamber 89. This venting of fluid from timing reservoir 91 and piston chamber 89 occurs through the atmospheric exhaust passage 315, as hereinbefore described, until the pressure of fluid acting on the lower face of the release valve 95 is overcome by the relatively light spring 102, then said spring moves said valve into engagement with seat rib 103, after which, the slight pressure still remaining in said reservoir and chamber is dissipated through the clearance space between said valve and the casing, to chamber 101 and from thence through passage 304, chamber 118, past valve 113 and through the atmospheric passage 115.

If instead of permitting a continuous and complete release of brakes after an application, as above described, it is desired to graduate the release of brakes, then the handle 38 is moved toward release position to some position in the service zone depending upon the degree of release of brakes it is desired to effect. This movement of handle 38 and the consequent movement of the fulcrum rod 73 towards the left hand causes a release of fluid under pressure from the brake cylinders 13 and timing reservoir 91 and piston chamber 89, in the same manner as hereinbefore described.

Since the pin 72 in the fulcrum rod 73 is only permitted to move towards the release position a distance corresponding to the movement of the handle 38, the clockwise rotation of lever 71 on said pin, upon movement of the lapping piston 86 towards the left hand, as fluid under pressure is vented from the lapping piston chamber 89, causes said lever to engage collar 85 on rod 81 and operate said rod and thereby turn the release toggle switch contact arm 65 in a counterclockwise direction until spring 69 snaps the contact 67 into engagement with contact 66 thereby energizing the release train wire 285 and consequently the release control magnet 97 and release magnet 172.

The energization of the release control magnet 97 seats valve 113 and unseats valve 116 so as to supply fluid under pressure from the timing reservoir 91 through pipe 305, passage 313, chambers 117 and 118 and through passage 304 to chamber 101 at the spring side of the release valve 95. The fluid pressures are thereby equalized on the opposite sides of the release valve 95, and spring 102 moves said valve into engagement with seat rib 103 so as to prevent further reduction in pressure in said timing reservoir and chamber 89, and consequently prevent further movement of the piston 86 toward the left hand.

The energization of the release magnet 172 seats valve 173 so as to prevent further venting of fluid under pressure from the application piston chamber 188 of the relay valve device 5 and from the connected variable load volume 262.

When the brake cylinder pressure in valve chamber 191 and chamber 189 of the relay valve device 5 is reduced to a degree slightly lower than the bottled pressure in the applicaton piston chamber 188, the application piston 187 is operated to move the exhaust valve 193 toward the right hand and lap the atmospheric vent passage 308 so as to prevent further venting of fluid under pressure from the brake cylinders 13. The apparatus now is in a lap condition in which a partial application of the brakes is held effective.

If now it is desired to further reduce brake cylinder pressure, the handle 38 is moved further toward the release position, which permits spring 78 to move the fulcrum rod 73 inwardly and thereby turn the lever in a counterclockwise direction about pin 88 to again operate the toggle switch arm 65 to open the circuit through the release train wire 285 and cause deenergization of the release control magnet 97 and release magnet 172. This permits a further venting of fluid from the brake cylinders 13 until the timing reservoir pressure is again reduced sufficiently to permit the lapping piston 86 to again operate lever 71 and toggle switch arm 65 to energize the release control magnet 97 and release magnet 172 to again lap the brakes.

By moving the handle 38 through the service zone to the release position in a series of successive stages, the apparatus will operate, as above described, to graduate off or provide a series of successive reductions in pressure in the brake cylinders 13 in accordance with the position of said handle.

From the above description of operation it will be noted that the lapping operation is automatically obtained in both applying and releasing the brakes by the operation of lapping piston 86 turning the lever 71 around the fulcrum pin 72, the position of which is fixed by the position of the handle 38. The operation of the lapping piston 86 is in turn controlled by the increase and decrease of pressure in the timing reservoir 91 and lapping piston chamber 89 as controlled by the operation of the application control valve 94 and release control valve 95.

The application magnet 180 and release magnet 172 operate in synchronism with the application control magnet 96 and release control magnet 97, respectively, so that during the period of time fluid under pressure is being supplied to or released from the timing reservoir 91 and lapping piston chamber 89, fluid under pressure is being simultaneously supplied to or released from the variable load chamber 262 and the application piston chamber 188 of the relay valve device 5, thereby causing corresponding variations in pressure in the brake cylinders 13.

In other words, the pressure obtained in the variable load chamber 262 and application piston chamber 188 and therefore in the brake cylinders 13 depends upon the time required to effect a sufficient change in pressure in the timing reservoir 91 and lapping piston chamber 89 to permit operation of the toggle switch arms 58 and 65 according to the position of the handle 38 and therefore the pin 72 upon which the lever 71 is fulcrumed.

Since the volume of the variable load chamber 262 depends upon the load carried by the car and is increased upon a reduction in the load, and is decreased upon an increase in the load, it will be evident that the pressure obtained therein and in the application piston chamber 188 of the relay valve device 5 and therefore in brake cylinders 13, during the period of time that a change in pressure in the timing reservoir 91 and lapping piston chamber 89 is being effected, will be greater for a heavy load than for a light load, or, in other words, will be proportional to the load carried by the car regardless of the degree of application as governed by the position of the brake valve handle.

When the handle 38 is moved into the service zone to effect a service application of the brakes electropneumatically, as above described, the cam 39 is also simultaneously turned in a counterclockwise direction, as viewed in Fig. 5 of the drawings. This relieves the pressure of cam 39 on the fulcrum member 26 and permits said member to move toward the right hand and the beam 27 to turn clockwise due to the action of spring 20 which urges the valve 16 to its seat to cut off the supply of fluid from the feed valve device 10 to chamber 14 and from thence to brake pipe 15. As the cam 39 is turned further, pressure is relieved from the brake pipe discharge valve stem 32 which permits spring 22 to move the discharge valve 17 away from its seat in the abutment 21.

The unseating of the brake pipe discharge valve 17 permits fluid under pressure to flow from the brake pipe 15, through chamber 14, past the brake pipe discharge valve 17 to spring chamber 24 and from thence to the atmosphere through the atmospheric exhaust passage 25.

As the brake pipe pressure is reduced in chamber 14 on the movable abutment 21, the regulating spring 23 moves said abutment toward the right hand. With the handle 38 and therefore cam 39 in a certain position in the service zone, fluid continues to be vented from the brake pipe 15 until the movable abutment 21 moves into engagement with the discharge valve 17 to prevent further venting.

If the handle 38 and therefore cam 39 are turned from release position only part way through the service zone, then the degree of reduction in brake pipe pressure effected past the discharge valve 17 is limited to less than a full service reduction. In such a case, if it is desired to increase the degree of brake pipe reduction, the handle 38 and cam 39 are turned further through the service zone in a counterclockwise direction, as viewed in Figs. 2 and 5 of the drawings. This action further relieves the pressure on the fulcrum member 26 which permits spring 22 to unseat the discharge valve 17 and effect a further reduction in brake pipe pressure, such reduction being limited by the regulating spring 23 moving the abutment 21 into engagement with the discharge valve 17.

From the above description it will be noted that the movable abutment 21 cooperates with the brake pipe discharge valve 17 to reduce brake pipe pressure a degree depending upon the movement of the handle 38 from release position into the service zone, and this movement may be either effected in a single movement or in a series of successive stages to effect a continuous or graduated reduction in brake pipe pressure, as desired.

The venting of fluid from the brake pipe 15 by way of the brake pipe discharge valve 17 causes a reduction in pressure on the face of the application control valve 94 and in the application magnet valve chamber 184, but such reduction in pressure on said valve and in said chamber in no way interferes with the simultaneous operation of the electropneumatic apparatus in effecting a service application of the brakes. The venting of fluid from the brake pipe 15 also causes a service reduction in pressure in the service valve piston chamber 125, but the piston 124 does not respond to such reduction when the application of brakes is being effected electropneumatically, since at the same time as the pressure is being reduced in the chamber 125, the auxiliary reservoir pressure acting in valve chamber 127 is being reduced by flow past the application valve 196 to chamber 191 in the relay valve device 5 and from thence to the brake cylinders 13 at such a rate as to prevent obtaining sufficient differential of pressures on piston 124 to move said piston.

If, however, when the handle 38 is moved into the service zone, and the brakes fail to apply electropneumatically in the manner hereinbefore described, such failure being due possibly to the failure of electric supply such as battery 11, then the service reduction in brake pipe pressure in piston chamber 125 of the service valve device 120 causes the piston 124 to move upwardly to service position which is defined by the engagement of said piston with a gasket 316. During this movement of piston 124, the auxiliary slide valve 131 is first shifted to uncover a service port 317 in the main slide valve 130 and then said main slide valve is moved to service position in which service port 317 registers with a passage 318. With the slide valves 130 and 131 in this service position, fluid under pressure supplied from the auxiliary reservoir to valve chamber 127 flows to passage 318 and from thence through a restricted port 319 in a choke plug to passage 289, then through said passage and pipe 288 to the variable load mechanism 6. Fluid thus supplied to the variable load mechanism flows past the ball valve 254 and through chamber 248 to passage 249 and from thence to the limiting valve diaphragm chamber 210, and at the same time as fluid thus flows past the ball valve 254, fluid under pressure also flows from passage 288 past the limiting valve 209 to chamber 210, from whence fluid flows through pipe 278 to the volume reservoir 279 and to chamber 277 at the left hand face of the double check valve piston 274. When the electropneumatic apparatus is ineffective, the chamber 275 in the double check valve device is vented to the atmosphere through the relay valve device, so that fluid under pressure supplied to chamber 277 shifts the piston 274 to its right hand position and thereby opens communication from chamber 277 to passage 280, through which communication, fluid flows to pipe 281 and from thence to the brake cylinders 13, thereby applying the brakes.

In case the reduction in brake pipe pressure effected by the brake pipe discharge valve 17 is less than a full service reduction, then when the auxiliary reservoir pressure in valve chamber 127 becomes reduced by flow through the service port 317 to a degree slightly lower than the brake pipe pressure in chamber 125, the differential of these pressures acting on piston 124 acts to shift said piston and auxiliary slide valve 131 to lap the service port 317 and thereby prevent further flow of fluid under pressure from the auxiliary reservoir. If a further reduction in brake pipe pressure is then effected the service piston is again moved to service position to permit a corresponding further reduction in auxiliary reservoir pressure, the maximum service reduction in brake pipe pressure and therefore in auxiliary reservoir pressure being limited by either equalization of auxiliary reservoir pressure into the brake cylinders 13 as may occur in case of a fully loaded car, or by the closure of the limiting valve 209 in the variable load mechanism 6 so as to prevent further flow of fluid from the auxiliary reservoir 12 to the brake cylinders, as in case the car is less than fully loaded, as will be hereinafter described.

When the pressure obtained in the brake cylinders 13 and acting on movable abutment 247 of the variable load mechanism exceeds the opposing pressure of spring 251, said abutment moves downwardly which permits spring 255 to seat valve 254 and cut off further flow of fluid past said valve. This valve 254 and its spring 255 are provided to permit a limited minimum application of brakes in case the limiting valve 209 should at any time fail to be normally in the unseated condition.

After the valve 254 is seated, fluid under pressure continues to flow to the brake cylinders 13 by way of passage 288 past the limiting valve 209 and through diaphragm chamber 210 so long as fluid is supplied by the service valve device 120 or until the brake cylinder pressure acting in said chamber on the diaphragm 211 overcomes the opposing pressure of the regulating spring 213, at which time said diaphragm is deflected toward the right hand. This permits spring 212 to seat the limiting valve 209 and thus limit the brake cylinder pressure to a degree governed by the adjustment of said spring and therefore proportional to the load on the car.

Whenever a service reduction is effected in brake pipe pressure a corresponding rate of reduction occurs in the emergency valve piston chamber 135, and permits the pressure in valve chamber 139 to move said piston and the auxiliary slide valve 143 outwardly to service position in which fluid under pressure is permitted to flow from valve chamber 139 and the connected quick action chamber 141, through a service port 320 in the auxiliary slide valve 143, and port 299 in the main slide valve 142 to atmospheric passage 300, at the same rate as the brake pipe pressure is reduced, thereby preventing further movement of said piston outwardly. When the pressure in valve chamber 139 is thus reduced to a degree slightly below the reduced brake pipe pressure in piston chamber 135, said piston is operated to return the auxiliary slide valve 143 to its normal position and thereby close communication from the service port 320 to port 299 so as to prevent further venting of fluid from the valve chamber 139.

In order to release the brakes after an application effected pneumatically in the manner above described, the handle 38 is turned to the release position and the cam 39 is consequently returned to its normal position, as shown in Fig. 5 of the drawings.

The turning of cam 39 to its normal position moves the fulcrum member 26 and the pivot pin 28 carrying the beam 27 toward the left hand, and with the brake pipe discharge valve 17 seated, the beam 27 acts through the push rod 29 to unseat the supply valve 16 against spring 20. With the supply valve 16 unseated, fluid is supplied from the feed valve device 10 to chamber 14 and from thence to brake pipe 15, thereby charging said brake pipe to the pressure of fluid supplied by said feed valve device. As the brake pipe pressure increases in chamber 14, said pressure acting on the abutment 21 moves same toward the left hand against the opposing pressure of the regulating spring 23, and such movement acts through the beam 27 to permit spring 20 to move the supply valve 16 towards its seat, but the regulating spring 23 is so adjusted with respect to the pressure of fluid supplied by said feed valve device, that when full feed valve pressure is acting in chamber 14 on abutment 21, said abutment will be so positioned as to maintain the supply valve 16 slightly unseated.

The increase in brake pipe pressure in piston chamber 125 of the service valve device shifts piston 124 and slide valves 130 and 131 to the release position in which the auxiliary reservoir 12 is recharged with fluid under pressure from the brake pipe and in which fluid is vented from the brake cylinders 13 by way of pipe 281, through passage 280 and chamber 277 in the double check valve device 7, through pipe 278, diaphragm chamber 210 in the variable load mechanism 6, from said chamber past the limiting valve 209 to passage 288, and at the same time through passage 249 and past the ball valve 254 to passage and pipe 288 and from thence through passage 289, restricted opening 290, passage 291, cavity 292 in the service valve slide valve 130 and through the exhaust passage 293 to the atmosphere. The reservoir volume 279 being connected to pipe 278 through which fluid under pressure is vented from the brake cylinders 13, fluid under pressure is also released from said reservoir volume upon the release of fluid under pressure from said brake cylinders.

When the pressure of fluid from the brake cylinders 13 acting in diaphragm chamber 210 on diaphragm 211 and in chamber 248 on piston 247 is reduced, as above described, to below the opposing pressures of springs 213 and 251, respectively, said springs act to unseat the valves 209 and 254 and place the apparatus in the release condition.

The increase in brake pipe pressure in the emergency valve piston chamber 135 in effecting a release of brakes after a service application, acts to shift piston 134 and the auxiliary slide valve 143 to the release position in which the valve chamber 139 and quick action chamber 141 are charged with fluid to the pressure carried in the brake pipe, in the manner hereinbefore described.

When a service application of the brakes is effected electropneumatically on a short train of cars, the reduction in brake pipe pressure effected by operation of the brake pipe discharge valve 17, the application control valve 94 and application magnet 100 may be sufficiently great before the relay valve device 5 operates to reduce auxiliary reservoir pressure by supplying fluid under pressure from said auxiliary reservoir to the brake cylinders 13, as to cause the service valve device 120 to move to service position and thereby establish the communication through which fluid under pressure is adapted to be supplied to chamber 277 in the double check valve device 7 and from thence to the brake cylinders, as when a service application of the brakes is effected pneumatically, as hereinbefore described.

If the electropneumatic brake controlling apparatus is functioning as intended, it is not desired that the brakes be applied by operation of the service valve device 120 as just described, and in order to ensure that such operation will not occur, the volume reservoir 279 is connected to pipe 278 and is adapted to delay or retard the build up of pressure in chamber 277 of the double check valve device, due to the supply of fluid under pressure from the service valve device 120, sufficiently to permit the relay valve device 5 to operate and supply sufficient pressure to chamber 275 at the opposite side of the double check valve piston 274 to move said double check valve piston to its left hand position, in case it is not in said position, or to hold said double check valve in said position, against the retarded increase in pressure in chamber 277, so that the brakes will be controlled electropneumatically through the operation of the relay valve device 5. The reservoir 279 serves no useful function except as just described.

If it is desired to effect an emergency application of the brakes, the handle 38 is turned to emergency position which permits operation of the brake pipe supply valve 16 to cut off the supply of fluid under pressure to chamber 14 and thus to the brake pipe, and also permits operation of the brake pipe discharge valve 17 to vent fluid under pressure from the brake pipe at a service rate, in the same manner as when a service application of the brakes is effected. In addition however, the movement of said handle to emergency position turns the cam 49, shown in Figs. 1 and 3, into engagement with stem 48 and unseats the brake pipe vent valve 40. With the vent valve 40 unseated, fluid under pressure is vented from the brake pipe 15 at an emergency rate through chamber 14, passage 42, vent valve chamber 41, past said vent valve, through the aperture 45, chamber 46 and from thence to the atmosphere through the atmospheric exhaust passage 47.

This emergency rate of reduction in brake pipe pressure initiated by the vent valve 40 causes a corresponding rate of reduction in pressure to occur in the service valve piston chamber 125 and emergency valve piston chamber 135 of the pneumatic brake controlling valve device 3 closest in the train to said vent valve, and the service valve device operates in the same manner as in effecting a service application of the brakes to supply fluid under pressure from the auxiliary reservoir 12 to the brake cylinders 13. The emergency rate of reduction in brake pipe pressure in the emergency piston chamber 135 permits the pressure of fluid in valve chamber 139 to move the piston 134 and thereby the slide valves 142 and 143 to emergency position which is defined by engagement of said piston with a gasket 321. It will be noted that piston 134 and slide valve 143 do not stop in the service position in moving from release position as when a service application of the brakes is effected due to the inability of service port 320 to reduce the pressure in chamber 139 at the emergency rate of brake pipe reduction effected in chamber 135.

At the time shoulder 146 on the emergency piston stem 144 engages the left hand end of the main slide valve 142, as the parts of the emergency valve device are moved to emergency position, the port 297 is uncovered by the auxiliary slide valve 143 which permits fluid under pressure to flow from valve chamber 139 and connected quick action chamber 141 through said port to passage 155, then upon movement of the main slide valve 142 to emergency position, the passage 155 is connected past the left hand end of the main slide valve 142 directly to chamber 139. Fluid under pressure thus supplied to passage 155 flows to the high pressure valve piston chamber 166 and to the brake pipe vent valve piston chamber 154.

Fluid under pressure thus supplied to the brake pipe vent valve piston chamber 154 moves the piston 153 toward the right hand and unseats the vent valve 150 which establishes a direct communication from the brake pipe 15 to the atmosphere through the vent valve chamber 151, chamber 158 and atmospheric passage 159, through which communication fluid under pressure is adapted to be completely vented from the brake pipe at an emergency rate for propagating, serially, emergency action through a train in the usual manner.

Fluid under pressure supplied to the high pressure valve piston chamber 166 moves the piston 165 and therefore plunger 164 toward the right hand until valve 170 is seated. This movement of plunger 164 acts to unseat the high pressure valve 160 which permits fluid from the main reservoir 8 to flow through the main reservoir pipe 9, passage 162, valve chamber 161, past the high pressure valve 160 to a chamber 322, and from thence through passage 323, past ball check valves 324, and through passage 325 to passage 289 to which fluid under pressure is supplied through the restricted opening 319 from the auxiliary reservoir 12 by operation of the service valve device 120.

Fluid under pressure thus supplied to passage 289 at a restricted rate from the auxiliary reservoir 12 and at a rapid rate from the main reservoir 8 flows to pipe 288 and from thence through the variable load mechanism 6 and double check valve device 7 to the brake cylinders 13, thereby rapidly applying the brakes.

The degree of pressure obtained in the brake cylinders in effecting an emergency application of the brakes as just described, is limited by the adjustment of the variable load mechanism 6 according to the load on the car in the same manner as when a service application of the brakes is effected pneumatically by the operation of the service valve device 120, the difference between the emergency and service applications residing in the faster rate obtained when an emergency application of the brakes is effected, than when a service application of the brakes is effected.

Fluid under pressure supplied from the quick action chamber 141 and emergency valve chamber 139 to operate the brake pipe vent valve piston 153 and high pressure valve piston 165 is gradually vented to the atmosphere through a restricted port 326 in the vent valve piston 153 to chamber 156, and from thence through passage 157, chamber 158 and atmospheric passage 159. When the pressure in chamber 154 is thus reduced sufficiently, spring 152 acts to seat the vent valve 150 so as to permit the brake pipe to be charged when it is desired to effect a release of the brakes, and when the pressure in the high pressure piston chamber 166 is reduced sufficiently, spring 163 acts to seat the high pressure valve 160. The size of the restricted port 326 is so proportioned to the combined volumes of the quick action chamber 141 and emergency valve chamber 139 that the vent valve 150 will not be permitted to seat until the brake pipe 15 is substantially completely vented, and the high pressure valve 160 is not permitted to seat until after the brakes are fully applied. The check valves 324 are provided to prevent leakage of fluid under pressure from the brake cylinders 13 and auxiliary reservoir 12, after the high pressure valve 160 is seated, by way of passages 289 and 325 to passage 323 and from thence through chamber 322 and past the plunger 164 to chamber 167 which is open to the atmosphere through passage 168.

When the handle 38 is moved to the emergency position to effect an emergency application of the brakes, the toggle switches are operated to effect energization of the release control magnet 97, application control magnet 96, release magnet 172 and application magnet 180 in the same manner as when a service application of the brakes is effected, but the energization of these magnets accomplishes no purpose, since the brake pipe 15 is completely and rapidly vented in emergency which eliminates the source of fluid under pressure upon which the application magnet 180 depends to effect the operation of the relay valve device 5.

In view of the ineffectiveness of the toggle switches and magnets of the apparatus when an emergency application of the brakes is effected, it will be evident that an emergency application of the brakes will be obtained in the manner above described regardless of whether said magnets are operative or inoperative.

In order to effect a release of brakes after an emergency application, the handle 38 is turned to release position which permits spring 43 to seat the brake pipe vent valve 40 and which operates the beam 27 to seat the brake pipe discharge valve 17 and unseat the brake pipe supply valve 16. With the supply valve unseated, fluid under pressure is supplied to the brake pipe 15, and the parts of the service valve device 120 and emergency valve device 121 are shifted to their release position by the consequent increase in brake pipe pressure. In the release position of the emergency valve device 121, the quick action chamber 141 is charged with fluid at brake pipe pressure, while in release position of the service valve device 120 the auxiliary reservoir 12 is charged with fluid under pressure from the brake pipe, and fluid under pressure is vented from the brake cylinders 13 by way of the double check valve device 7, variable load mechanism 6 and service valve device 120, in the same manner as hereinbefore described.

It will now be noted that according to the invention, a brake equipment is provided which is operative upon movement of the combined brake valve and brake switch device 1 into the service zone to effect an application of the brakes electropneumatically, but in case the electrically controlled apparatus fails to apply the brakes as intended, the brakes will be applied pneumatically by the reduction in brake pipe pressure. In the case of an electropneumatic application of the brakes, the degree of brake application is varied according to the load on the car regardless of the degree of the application, while in case the application of the brakes is effected pneumatically due to a reduction in brake pipe pressure, only the maximum degree of application is limited in accordance with the load on the car. An emergency application of the brakes is obtainable only by reducing the brake pipe pressure at an emergency rate, such application being obtainable at a faster rate than a service application is obtained, but the degree is limited according to the load on the car the same as when a service application of the brakes is effected due to a service reduction in brake pipe pressure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a manually operable member, of electroresponsive means and fluid pressure responsive means each operative to effect an application of the brakes which varies according to the extent of movement of said member, and means for regulating the degree with which the brakes are applied, by the operation of both of said means, according to the load on the vehicle.

2. In a brake apparatus, the combination with a valve device having a chamber and operative according to the increase and decrease in pressure in said chamber to effect varying degrees of application and release of brakes, valve means for supplying and releasing fluid under pressure to and from said chamber, a variable volume in constant communication with said chamber, means for decreasing the volume of said variable volume upon an increase in car load and for increasing the volume of said variable volume upon a decrease in car load, and mechanism operated when a car is stopped for operating said means to vary said volume according to the change in car load and for locking said means and thereby said volume in an adjusted condition when the car is running.

3. In a brake apparatus, the combination with a valve device having a control chamber and operative according to variations in pressure in said control chamber to effect an application and a release of brakes according to the degree of pressure in said control chamber, a manually movable control member, electroresponsive means operative to supply fluid under pressure to said chamber and to vent fluid under pressure from said chamber for a time interval depending upon the extent of movement of said control member, a volume chamber in constant communication with said control chamber, means operative according to relative movement between the body and truck of a car, upon a change in car load, for increasing the volume of said volume chamber upon a decrease in car load and for decreasing the volume of said volume chamber upon an increase in car load, and means for holding the volume chamber in an adjusted condition.

4. In a brake apparatus, the combination with a valve device having a chamber and operative to effect an application and release of the brakes according to the pressure in said chamber, a manually operated means, electroresponsive means operative to supply fluid under pressure to and release fluid under pressure from said chamber for time intervals depending upon the extent of movement of said manually operated means, a volume adjusted according to the load on the car and in constant communication with said chamber for varying the pressure in said chamber according to the load on the car, means including a member for increasing said volume upon a decrease in the car load and for decreasing said volume upon an increase in the car load, valve means controlled by said manually operated means and operative to supply and release fluid under pressure for effecting an application and release of brakes, means, including a spring, for limiting the degree of brake application effected by the operation of said valve means in accordance with the load on the car, means including a member for increasing the pressure of said spring upon an increase in the load on the car and for decreasing the pressure of said spring upon a decrease in the load on the car, an element for operating said members according to relative movement between the body and truck of the car for adjusting said volume and spring according to the load on the car, and means including an element for locking said volume and spring in an adjusted condition while the car is running.

5. In a brake apparatus, in combination, means operative to supply fluid under pressure for applying brakes and for releasing fluid under pressure for releasing brakes, a member movable to any desired position in a zone for initiating the operation of said means, means for effecting the operation of said means to limit the amount of fluid under pressure supplied by or released by the operation of said means in accordance with the position of said member in said zone, and means for varying the pressure of fluid obtained by the operation of the first mentioned means in accordance with the load on the car.

6. In a brake apparatus, in combination, means operative to supply fluid under pressure for applying brakes and releasing fluid under pressure for releasing brakes, a member movable to any desired position in a zone for initiating the operation of said means, means operative according to the position of said member in said zone, and other means operable according to the load on the car, the two last mentioned means cooperating to adjust the degree of application or release of brakes in accordance with the position of said member in said zone and in accordance with the load on the car.

7. In a brake apparatus, in combination, a manually controlled member movable in a zone for varying the application and release of brakes, means controlled by said member and operative to effect a supply or release of fluid under pressure in amounts corresponding to the position of said member in said zone, for effecting an application or release of the brakes, respectively, and means for varying the pressure of fluid obtained by operation of said means, and for thereby varying the degree of application or release of brakes, in accordance with the load on the car.

8. In a braking apparatus, in combination, means having a chamber to which fluid under pressure is supplied for effecting an application of the brakes and from which fluid under pressure is vented to effect a release of the brakes, manually controlled valve means operative to control the supply of fluid under pressure to and the release of fluid under pressure from said chamber, and mechanism for varying the pressure of fluid obtained in said chamber by the operation of said valve means in accordance with the load on the car, said mechanism comprising means for increasing the volume of said chamber in accordance with the reduction in car load and for decreasing the volume of said chamber in accordance with the increase in car load, means for operating the last mentioned means according to the change in car load when the car is stopped, and means for locking said last mentioned means and thereby said chamber in the adjusted condition when the car is running.

9. In a braking apparatus, in combination, means having a chamber to which fluid under pressure is supplied for effecting an application of the brakes and from which fluid under pressure is vented to effect a release of the brakes, manually controlled valve means operative to control the supply of fluid under pressure to and the release of fluid under pressure from said chamber, and mechanism for varying the pressure of fluid obtained in said chamber by the operation of said valve means in accordance with the load on the car, said mechanism comprising means for increasing the volume of said chamber in accordance with the reduction in car load and for decreasing the volume of said chamber in accordance with the increase in car load, means automatically operative for operating the last mentioned means according to the change in car load when the car is stopped, and means automatically operative for locking said last mentioned means and thereby said chamber in the adjusted condition when the car is running.

10. In a braking apparatus, in combination, a brake cylinder, valve means operative to effect a supply of fluid under pressure to said brake cylinder, pressure responsive means for limiting the degree of pressure obtained in said brake cylinder by the operation of said valve means in accordance with the load on the car, switch means operative to effect a supply of fluid under pressure to said brake cylinder, means adjusted according to the load on the car for varying in accordance with the load on the car the pressure of fluid obtained in said brake cylinder by the operation of said switch means, a manually operative member for effecting the simultaneous operation of said valve means and switch means, and means operative when fluid under pressure is supplied to said brake cylinder by the operation of said switch means for rendering said valve means ineffective.

11. In a braking apparatus, in combination, a brake cylinder, valve means operative to effect a supply of fluid under pressure to said brake cylinder, pressure responsive means for limiting the degree of pressure obtained in said brake cylinder by the operation of said valve means in accordance with the load on the car, switch means operative to effect a supply of fluid under pressure to said brake cylinder, means adjusted according to the load on the car for varying in accordance with the load on the car the pressure of fluid obtained in said brake cylinder by the operation of said switch means, a manually operative member for effecting the simultaneous operation of said valve means and switch means, and means operative when fluid under pressure is supplied to said brake cylinder by the operation of said switch means for closing communication from said brake cylinder to said valve means for thereby rendering said valve means ineffective.

12. In a braking mechanism, in combination, a brake cylinder, two manually controlled means for supplying fluid under pressure to said brake cylinder and for releasing fluid under pressure from said brake cylinder, pressure exerting means, means operative according to the pressure of said pressure exerting means to limit the pressure of fluid obtained in said brake cylinder by the operation of one of said manually controlled means, a variable volume for regulating the pressure of fluid obtained in said brake cylinder by the operation of the other manually controlled means, means for simultaneously adjusting the pressure of said pressure exerting means and the volume of said variable volume in accordance with the load on the car, and means for simultaneously locking said pressure exerting means and variable volume in an adjusted condition.

13. In a braking mechanism, in combination, a brake cylinder, two manually controlled means for supplying fluid under pressure to said brake cylinder and for releasing fluid under pressure from said brake cylinder, pressure exerting means, means operative according to the pressure of said pressure exerting means to limit the pressure of fluid obtained in said brake cylinder by the operation of one of said manually controlled means, a variable volume for regulating the pressure of fluid obtained in said brake cylinder by the operation of the other manually controlled means, an element movable according to a change in the load on the car for adjusting the pressure of said pressure exerting means and the volume of said variable volume in accordance with the load on the car, and a member for locking said element and thereby said pressure exerting means and variable volume in its adjusted condition.

14. In a braking mechanism, in combination, a brake cylinder, two manually controlled means for supplying fluid under pressure to said brake cylinder and for releasing fluid under pressure from said brake cylinder, pressure exerting means, means operative according to the pressure of said pressure exerting means to limit the pressure of fluid obtained in said brake cylinder by the operation of one of said manually controlled means, a variable volume for regulating the pressure of fluid obtained in said brake cylinder by the operation of the other manually controlled means, means operative automatically for simultaneously adjusting the pressure of said pressure exerting means and the volume of said variable volume in accordance with the load on the car, and means operative automatically for simultaneously locking said pressure exerting means and variable volume in an adjusted condition.

15. In a braking mechanism, in combination, a brake cylinder, two manually controlled means operative simultaneously for at one time supplying fluid under pressure to said brake cylinder and at another time releasing fluid under pressure from said brake cylinder, pressure exerting means, means operative according to the pressure of said pressure exerting means to limit the pressure of fluid obtained in said brake cylinder by the operation of one of said manually controlled means, a variable volume for regulating the pressure of fluid obtained in said brake cylinder by the operation of the other manually controlled means, means operative to adjust the pressure of said pressure exerting means and the volume of said variable volume in accordance with the load on the car, and means for rendering ineffective the operation of said one manually controlled means when said other manually controlled means is effective.

16. In a brake apparatus, in combination, a valve device having a chamber and operative according to the increase and decrease in pressure in said chamber to effect varying degrees of application and release of brakes, valve means automatically operative for supplying fluid under pressure to and releasing fluid under pressure from said chamber in predetermined amounts for controlling the operation of said valve device, means for decreasing the volume of said chamber upon an increase in car load and for increasing the volume of said chamber upon a decrease in car load, and mechanism for operating said means.

17. In a brake apparatus, in combination, a valve device having a chamber and operative according to the increase and decrease in pressure in said chamber to effect varying degrees of application and release of brakes, valve means automatically operative for supplying fluid under pressure to and releasing fluid under pressure from said chamber for predetermined intervals of time for controlling the operation of said valve device, means for decreasing the volume of said chamber upon an increase in car load and for increasing the volume of said chamber upon a decrease in car load, and mechanism automatically operative upon a change in car load for operating said means.

18. In a brake apparatus, the combination with a brake cylinder, of fluid pressure operative means for supplying fluid under pressure to and releasing fluid under pressure from said brake cylinder, a manually operated member movable in a brake controlling zone, valve means responsive to the movement of said member for supplying fluid under pressure to and releasing fluid under pressure from said fluid pressure operated means, means for varying the amount of fluid under pressure acting on said fluid pressure operated means by the operation of said valve means in accordance with the position of said member in said zone, and means for varying the pressure obtained on said fluid pressure operated means by said valve means according to the load on the car.

SAMUEL L. WILLIAMS.